United States Patent
Wang et al.

(10) Patent No.: US 10,440,605 B2
(45) Date of Patent: Oct. 8, 2019

(54) COOPERATION BETWEEN WIRELESS COMMUNICATION NETWORKS

(71) Applicant: Telefonaktiebolaget LM Ericsson (publ), Stockholm (SE)

(72) Inventors: Yu Wang, Solna (SE); Mattias Tan Bergström, Stockholm (SE); Patrik Rugeland, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/752,017

(22) PCT Filed: Sep. 23, 2015

(86) PCT No.: PCT/SE2015/050991
§ 371 (c)(1),
(2) Date: Feb. 12, 2018

(87) PCT Pub. No.: WO2017/052429
PCT Pub. Date: Mar. 30, 2017

(65) Prior Publication Data
US 2018/0242189 A1     Aug. 23, 2018

(51) Int. Cl.
*H04W 80/04*    (2009.01)
*H04W 28/02*    (2009.01)
(Continued)

(52) U.S. Cl.
CPC ....... *H04W 28/0278* (2013.01); *H04W 28/08* (2013.01); *H04W 72/1284* (2013.01);
(Continued)

(58) Field of Classification Search
CPC ..... H04W 80/04; H04W 84/12; H04W 88/06; H04W 88/08; H04W 84/18
See application file for complete search history.

(56) References Cited

U.S. PATENT DOCUMENTS

2006/0074970 A1*  4/2006  Narayanan ..........  G06F 11/3419
2010/0022251 A1*  1/2010  Watanabe .............  H04W 28/22
                                                                455/450
(Continued)

FOREIGN PATENT DOCUMENTS

CN     103813388 A     5/2014
EP       2536226 A2   12/2012
(Continued)

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.5.0, Mar. 2015, 1-77.
(Continued)

*Primary Examiner* — Hassan A Phillips
*Assistant Examiner* — Prenell P Jones
(74) *Attorney, Agent, or Firm* — Sage Patent Group

(57) ABSTRACT

Network nodes and methods therein are provided for cooperation between different wireless communications networks, such as between a 3GPP network and a WLAN. Information related to a buffer status of at least one wireless device is provided by a first network node operating in a first wireless communication network, to a second network node operating in a second wireless communication network. The information may be an indication of a buffer status of a UE which the first network node considers steering to the second wireless network. The second network node may reply with an estimate of a possible throughput for the UE, where the estimate is based on the information related to a buffer status.

20 Claims, 8 Drawing Sheets

(51) Int. Cl.
*H04W 28/08* (2009.01)
*H04W 72/12* (2009.01)
*H04W 84/12* (2009.01)
*H04W 36/14* (2009.01)
*H04W 36/22* (2009.01)

(52) U.S. Cl.
CPC ............ *H04W 36/14* (2013.01); *H04W 36/22* (2013.01); *H04W 72/1226* (2013.01); *H04W 84/12* (2013.01)

(56) References Cited

U.S. PATENT DOCUMENTS

| | | | | |
|---|---|---|---|---|
| 2014/0140209 | A1* | 5/2014 | Shihada | H04L 43/0864 370/230 |
| 2015/0282032 | A1* | 10/2015 | Gupta | H04W 36/22 370/237 |
| 2016/0050246 | A1* | 2/2016 | Liao | H04L 5/0085 709/219 |
| 2016/0073404 | A1* | 3/2016 | Vutukuri | H04W 72/042 370/329 |
| 2016/0073428 | A1* | 3/2016 | Vutukuri | H04W 72/1215 370/329 |
| 2016/0360445 | A1* | 12/2016 | Eason | H04W 48/18 |
| 2017/0325121 | A1* | 11/2017 | Zhang | H04W 72/1284 |
| 2018/0206282 | A1* | 7/2018 | Singh | H04W 88/06 |

FOREIGN PATENT DOCUMENTS

| | | |
|---|---|---|
| EP | 2723144 A1 | 4/2014 |
| GB | 2494633 A | 3/2013 |
| KR | 20140118650 A | 10/2014 |
| WO | 2014043500 A1 | 3/2014 |
| WO | 2014145845 A1 | 9/2014 |
| WO | 2014161629 A1 | 10/2014 |

OTHER PUBLICATIONS

Imagaki, Yuichi et al., "Novel Wi-Fi Throughput Estimation Method Considering CSMA/CA Behavior", IEEE, 2012, 1-5.

Villegas, Eduard G. et al., "Self-Optimization of Radio Resources on IEEE 802.11 Networks", Ph.D. Thesis, Wireless Networks Group (WNG), Telematics Department, Universitat Politecnica de Catalunya (UPC), Jul. 2009, 1-248.

3GPP, "3rd Generation Partnership Project; Technical Specification Group Radio Access Network; Study on Multi-RAT joint coordination (Release 13)", 3GPP TR 37.870 V1.0.0, Feb. 2015, 1-22.

\* cited by examiner

COOPERATION BETWEEN WIRELESS COMMUNICATION NETWORKS

TECHNICAL FIELD

The embodiments of the present invention relate to cooperation between wireless communications networks operating according to different standards for wireless communication, such as LTE and WLAN.

BACKGROUND

Wi-Fi, also known as WLAN (Wireless Local Area Network), is standardized by IEEE (Institute of Electrical and Electronics Engineers) in the 802.11 specifications (IEEE Standard for Information technology—Tele-communications and information exchange between systems. Local and metropolitan area networks—Specific requirements. Part 11: Wireless LAN Medium Access Control (MAC) and Physical Layer (PHY) Specifications). The terms Wi-Fi and WLAN will be used interchangeably throughout this document. Wi-Fi is a technology that currently mainly operates on the 2.4 GHz or the 5 GHz band. The IEEE 802.11 specifications regulate the STA (STAtion, i.e. access points or wireless terminals) physical layer, MAC layer and other aspects to secure compatibility and inter-operability between access points and portable terminals, which herein will be referred to as wireless devices or user equipment, UEs. Wi-Fi is generally operated in unlicensed bands, and as such, communication over Wi-Fi may be subject to interference sources from any number of both known and unknown devices. Wi-Fi is commonly used as wireless extensions to fixed broadband access, e.g., in domestic environments and hotspots, like airports, train stations and restaurants.

Recently, Wi-Fi has been subject to increased interest from cellular network operators, not only as an extension to fixed broadband access. The interest is mainly about using the Wi-Fi technology as an extension, or alternative, to cellular radio access network technologies to handle the ever increasing wireless bandwidth demands. Cellular operators that are currently serving mobile users with, e.g., any of the 3GPP technologies, LTE, UMTS/WCDMA, or GSM, consider Wi-Fi as a wireless technology that can provide good support in their regular cellular networks. The term "operator-controlled Wi-Fi" refers to a Wi-Fi deployment that on some level is integrated with a cellular network operator's existing network, and where the 3GPP radio access networks and the Wi-Fi wireless access may even be connected to the same core network and provide the same services.

There is currently quite intense activity in the area of operator-controlled Wi-Fi in several standardization organizations. In 3GPP, activities to connect Wi-Fi access points to the 3GPP-specified core network is pursued, and in Wi-Fi alliance (WFA), activities related to certification of Wi-Fi products are undertaken, which to some extent also is driven by the need to make Wi-Fi a viable wireless technology for cellular operators to support high bandwidth offerings in their networks. The term 'Wi-Fi offload' is commonly used and refers to that cellular network operators seek means to offload traffic from their cellular networks to Wi-Fi, e.g., in peak-traffic-hours and in situations when the cellular network for one reason or another needs to be off-loaded, e.g., to provide requested quality of service, maximize bandwidth or simply to ensure coverage.

When considering steering traffic from LTE to Wi-Fi as a way to improve user experience, one of the most important QoS indicators for most data services is the user throughput. Thus, in order to decide if user traffic should be steered from a current serving RAT or network to another, the user throughput in the other RAT or network needs to be evaluated. Since the evaluation needs to be performed before any data is actually transferred in the other RAT, very limited knowledge can be assumed as being the input to traffic steering functions.

User throughput prediction in a Wi-Fi system has been previously studied. In such studies, the predicted Wi-Fi throughput is estimated based on cell level statistics including served traffic, average traffic load, the number of currently connected users and/or packet transmission statistics as well as limited UE specific knowledge, e.g. a measured signal strength. As a contention based system, the DL and UL traffic in a WLAN cell will compete for the channel access. And nodes in one cell may compete for the channel access with nodes in neighbor cells operating on the same channel as well. These factors should be considered in the throughput estimation.

In order to optimize user experience in a multi-radio access technology (RAT) environment, the RAT or network that provides the highest user throughput should be selected to serve the user, given that throughput is identified as very important for user experience. User throughput prediction is a critical component for this optimization. However, it's a challenging task to predict user throughput, especially when input information is limited, which is the case when the user has not been connected to the network yet.

In other words, it is very important to predict the throughput in a wireless communication network, e.g. in order to evaluate whether to steer user traffic to a WLAN from an LTE system while maintaining a high user satisfaction. However, it is identified as a problem how to predict such a throughput in a satisfying manner.

SUMMARY

Herein, an inter-network cooperation concerning buffer status of a UE served by one of the networks is suggested. It is suggested that information related to a buffer status associated with at least one wireless device is communicated to a network node in another wireless communication network. According to some embodiments, a new type of message is proposed to be communicated between a 3GPP network and a WLAN. The communication of information related to buffer status and associated methods according to the appended set of claims can improve the accuracy of user throughput prediction in WLAN while the user is connected to a 3GPP network and not yet associated to a Wi-Fi network. The information may comprise information about user DL and/or UL buffer status or transmission statistics, which can be used as input in WLAN user throughput prediction.

More accurate user throughput prediction helps to improve user QoE (Quality of Experience) e.g. by utilizing it for smart traffic steering between 3GPP and WLAN and reduce the number of unnecessary handovers between the two systems which may cause degraded user experience.

According to a first aspect, a method is provided, which is to be performed by a first network node operable in a first wireless communication network. The method comprises providing information related to a buffer status of at least one wireless device to a second network node in a second wireless communication network.

According to a second aspect, a method is provided, which is to be performed by a second network node operable in a second wireless communication network. The method comprises obtaining information related to a buffer status of at least one wireless device from a first network node in a first wireless communication network.

According to a third aspect, a first network node is provided, which is operable in a first wireless communication network. The first network node is configured to provide information related to a buffer status of at least one wireless device to a second network node in a second wireless communication network.

According to a fourth aspect, a second network node is provided, which is operable in a second wireless communication network. The second network node is configured to obtain information related to a buffer status of at least one wireless device from a first network node in a first wireless communication network.

According to a fifth aspect, a computer program is provided, which comprises instructions which, when executed on at least one processor, cause the at least one processor to carry out the method according to the first or second aspect.

According to a sixth aspect, a carrier is provided, which contains the computer program of the previous aspect.

BRIEF DESCRIPTION OF DRAWINGS

The foregoing and other objects, features, and advantages of the technology disclosed herein will be apparent from the following more particular description of embodiments as illustrated in the accompanying drawings. The drawings are not necessarily to scale, emphasis instead being placed upon illustrating the principles of the technology disclosed herein.

DETAILED DESCRIPTION

In LTE the concept of buffer status reporting has been introduced to allow the eNB (i.e. the LTE base station) to be aware of how much uplink data the UE has in its buffers. This allows the eNB to know with how much resources the eNB should schedule the UE in uplink. The buffer status is sent in a Buffer Status Report, which is signaled by the MAC layer in the UE. The UE sends a Buffer Status Report to the eNB when new data arrives to an empty buffer, or when new data arrives which has higher priority than the data already in the buffer, or based on timers.

The inventors have realized that buffer status information could be utilized e.g. to improve the prediction of a user throughput in a network e.g. to which the user has not yet connected.

Figure 1:
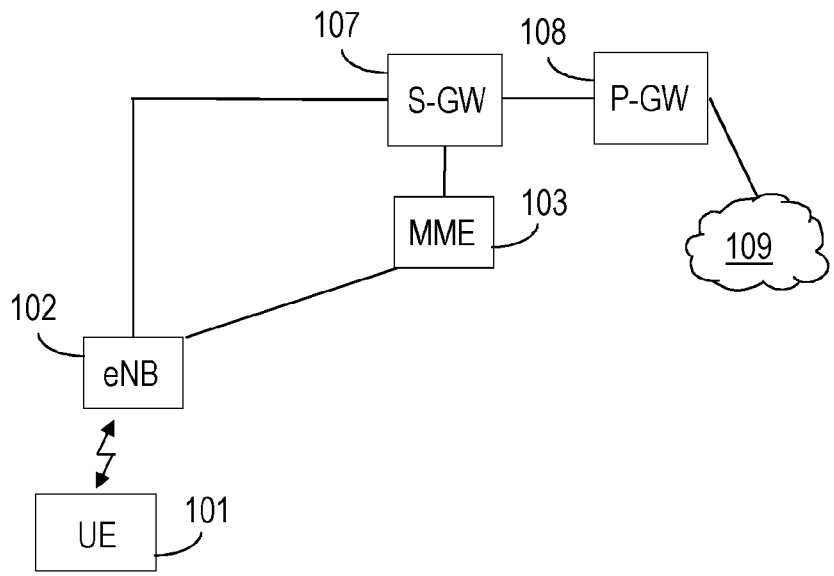
FIG. 1 shows an LTE network according to the prior art.

FIG. 1 illustrates a basic architecture of an LTE network in which embodiments of the solution described herein may be applied. FIG. 1 shows a wireless device 101, also denoted "UE" in the figure. The wireless device is served by a Radio Access, RA, node 102, also denoted "eNB" in the figure. The wireless device 101 may also be referred to as camping on a cell provided by the RA node, or as being connected to the RA node 102, or as being connected to the network via the RA node 102. The RA node 102 is connected to a network node 103, also denoted Mobility Management Entity, MME. The MME handles e.g. connection and release of bearers to a wireless device and also handles wireless device transitions between IDLE and ACTIVE state.

One MME is connected to a plurality of RA nodes, which in their turn may serve a plurality of wireless devices. A Serving Gateway, S-GW, 107, connects the LTE core network to the LTE Radio Access Network, RAN. A Packet Data Network Gateway, P-GW, 108, connects the S-GW to the internet 109, and/or some other Packet Data Network, PDN.

Figure 2:
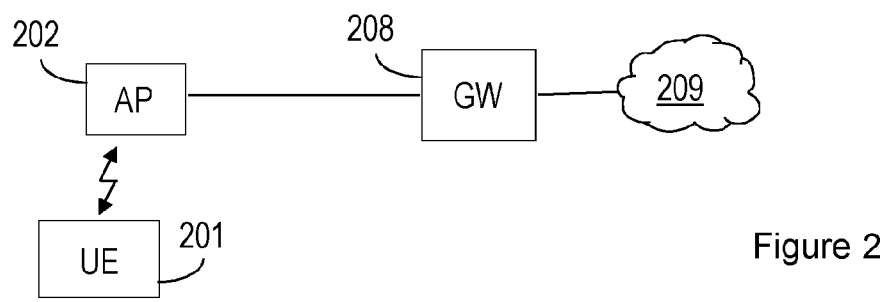
FIG. 2 shows a WLAN network according to the prior art.

Further, FIG. 2 illustrates an exemplifying architecture of a Wireless Local Area Network, WLAN in which embodiments of the solution described herein may be applied. In a WLAN, the RA nodes are often referred to as Access Points, APs, which is also the terminology used in figure herein. The AP 102c is connected to the Internet 109c via a gateway 108c.

According to embodiments of the solution described herein, the inventors propose a new type of information, e.g. a message, $M_B$, to be communicated between two different communication networks, such as a 3GPP network and a WLAN network. That is, the new information or message could be sent from a node, such as an eNB, an RNC, or other 3GPP related node, to a WLAN network node, such as a WLAN AP, a WLAN AC (Access Controller) or other WLAN related node. The information or message contains information related to UE DL/UL buffer status. The information can be used e.g. as input for user throughput prediction in WLAN. The throughput prediction results based on the buffer status information may be used for different purposes, e.g. traffic steering between the 3GPP and WLAN networks.

It should be appreciated that herein, an LTE network and a WLAN network is used as an example of two different networks. However, it would also be possible to apply the principles of the solution described herein in other combinations of network types, such as e.g. UMTS, WiMAX, GSM, CDMA2000, etc.

It should further be noted that when it herein is stated that e.g. the eNB is "initiating steering of", or "steering" traffic to WLAN, this may refer to completely steering (moving, transferring) a certain traffic to WLAN, but it may also refer to steering only part of the traffic by e.g. aggregation between the WLAN and LTE network, e.g. such that a UE would receive part of the packets in a traffic flow over LTE and part of the traffic over WLAN.

Different embodiments will be described herein with reference to FIGS. 3-9, The embodiments relate to different ways to communicate information related to a buffer status, and different ways to utilize the information for traffic steering and/or e.g. admission control.

A common technical feature of the embodiments described herein is that information related to a buffer status is communicated from a first wireless communication network to a second wireless communication network. Depending on embodiment, the information is either an indication of data in one or more buffers associated with at least one wireless device (cf. embodiment A and D in FIG. 3), or, a number, or set, of alternative estimated possible throughputs given different buffer statuses of at least one wireless device (cf. embodiment B and C in FIG. 3).

Figure 3:
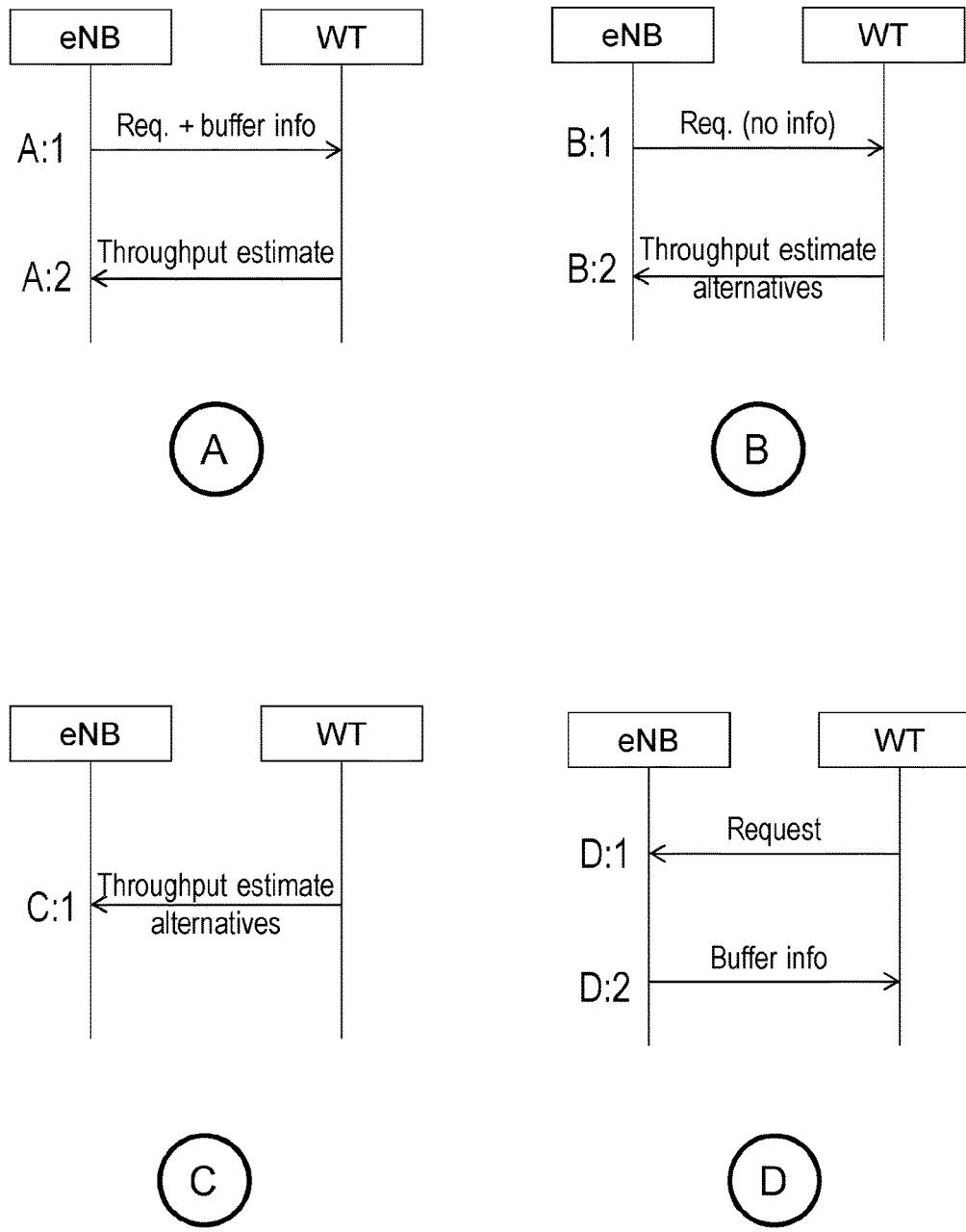
FIG. 3 shows different embodiments of the solution described herein.

FIG. 3 shows four different embodiments of the solution described herein, which are marked as A-D. Of these embodiments, A-C are primarily related to throughput prediction and possible traffic steering, and embodiment D is instead related to e.g. admission control for at least one wireless device into the second wireless communication network These different embodiments will be described below with the communicating nodes and networks exemplified as an eNB in an LTE network and a WLAN Termination point, WT, in a WLAN system.

The exemplifying embodiment marked A in FIG. 3 relates to a method for throughput prediction and possible traffic steering. An eNB, serving a number of UEs, sends a request A:1, to a WT, for an estimated throughput in the WLAN. The request comprises an indication of a buffer status of, i.e. associated with, at least one wireless terminal/UE. The at least one UE may be identified in the request e. by a UE identifier in association with the respective buffer status indication. The indication may be either an explicit or coded indication of an amount of data present in an UL and/or DL buffer; or e.g. be a binary indication of whether an UL and/or DL buffer comprises data or not. This corresponds to the common technical feature of providing information related to a buffer status of at least one wireless device to a node in another communication network. In order to simplify the language of this description, it will be assumed below that the information is related to the UL and/or DL buffer of one UE. The information related to the DL buffer is readily available in the eNB, whereas the information related to the UL buffer could be obtained from the UE. For example, the eNB may request a buffer status report (BSR) from a UE to access the information on how much data is in a UE UL buffer to send. Alternatively, the eNB may estimate the UL buffer status based on transmission statistics, e.g. if a UE has been transmitting UL traffic for a while, the probability that there is additional traffic in UL buffer is high.

The WT obtains the request and the indication of buffer status, i.e. of at least part of the content of one or more buffers associated with the UE. The WT then predicts a throughput in the WLAN for the UE, which could be offered to the UE if it would attach to the WLAN with/having the indicated buffer contents. The buffer status could be regarded as an indication of the traffic situation or activity of the UE, which will be further described below. The WT provides the predicted throughput A:2 to the eNB, which obtains it. Based on the predicted throughput obtained from the WT, the eNB can decide whether to steer the traffic related to the buffer status to the WLAN or not. This embodiment is advantageous in that the prediction of throughput is based on actual buffer status(es), and that the WT only needs to determine and provide throughput estimates for the actual buffer status, and not a set of default buffer statuses, as in other embodiments which will be described below. If the WT is unable to admit the UE e.g. if this would impact the other already connected UEs too much, the WT could provide a throughput estimate of zero. Alternatively the WT could refrain from providing A:2 and instead provide a message stating that it cannot accept the UE.

The exemplifying embodiment marked B in FIG. 3 is also related to a method for throughput prediction and possible traffic steering. In this case, the eNB does not provide the WT with information on actual buffer statuses of UEs, but only sends a request B:1 for a prediction of a possible throughput for one or more UEs. For example, the request could indicate a number of UEs, which the eNB may desire to (at least partly) steer to the WLAN. The WT obtains the request, which here does not comprise any indication of the contents of a UE related buffer. The WT then predicts a possible throughput for the number of UEs at hand, for a set of default buffer statuses. Since the WLAN throughput will depend on the number of UEs which are actually steered to or connected to the WLAN, different alternatives may be predicted for combinations of one, two or more of the number UEs, i.e. for the cases when the eNB decides to only steer a subset of the indicated number of UEs to the WLAN. There could be more than one set of default buffer statuses, and in such a case one of them, i.e. the desired one, could be indicated in the request. The WT then provides the predicted possible throughputs B:2 to the eNB, e.g. in form of a list or table, as the one exemplified further below (table 1). The predicted possible throughputs B:2 are obtained by the eNB, which also has access to the actual buffer status of the UE(s) in question. Thus, the eNB can e.g. select an entry in the list of predicted possible throughputs for a default buffer status which best matches or corresponds to the actual buffer status of the UE, and decide whether to steer the traffic related to the UE to the WLAN or not. In this embodiment, the providing of the predicted possible throughputs B:2 to the eNB corresponds to the common technical feature of providing information related to a buffer status of at least one wireless device to a second network node in a second wireless communication network; the information being the predicted possible throughputs for the set of default buffer statuses of at least one wireless device. In this embodiment, the eNB need not provide information on actual UE buffer status to the WT, i.e. the UE buffer status may remain hidden from the WLAN network, which may be desirable.

The exemplifying embodiment marked C in FIG. 3 is also related to a method for traffic steering, and is similar to the embodiment marked B, but with the difference that no request for throughput predictions is transmitted from the eNB to the WT. Instead, the WT sends, e.g. periodically, a number of predicted possible throughputs for a set of default buffer statuses. Here, the eNB will not indicate a number of UEs, or a preferred set of default buffer statuses, and hence these need to be configured or otherwise agreed upon. For example, the WT could determine and provide an estimated throughput per default buffer status for one UE. Alternatively or in addition, the WT could determine and provide an estimated throughput per default buffer status for two or more UEs, implying more alternative combinations. The eNB or some other network node may, for example, configure the WT with when to start a periodic throughput prediction, and/or with a period of the providing of throughput information. The throughput estimates are obtained by the eNB, which may decide whether to steer traffic associated with a UE to the WLAN or not based on a selected appropriate estimate out of the obtained estimates. One benefit of this embodiment, as compared to the one marked B, is that the eNB need not indicate to the WLAN when it considers steering traffic to the WLAN, but will obtain, e.g. periodically, information about possible throughput for UEs, currently served by the eNB, in the WLAN. This will however also mean that the WI may determine and provide information to the eNB, which is uncalled for, and which will not be used.

The exemplifying embodiment marked D in FIG. 3 differs from the others (A-C) in that it relates to other possible usages than throughput prediction, of a buffer status of at least one wireless device. For example, a WLAN could benefit from having knowledge of the buffer status of a UE, e.g. for admission control. When the WLAN gets a connection request from a UE connected to the eNB, it could decide whether to admit or reject the UE's connection attempt based on the buffer status information, assuming that the buffer status is an indication of expected UE activity after connection to the WLAN.

Features of the embodiments A-D will be described in further detail below with reference to FIGS. 4-7. In the descriptions, it will be assumed that it is buffer information associated with one UE that is provided and/or obtained, in order to simplify the description. However, as previously stated, it may be information related to more than one UE.

Figure 4:
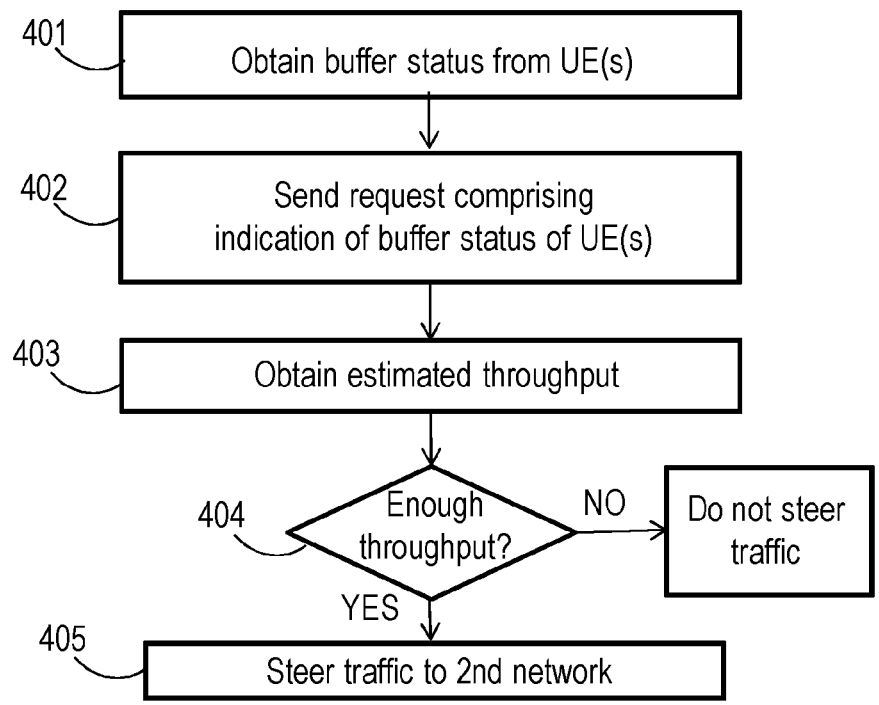
FIG. 4 is a flow chart showing a method performed by a 3GPP node, according to an exemplifying embodiment.

FIG. 4 illustrates an exemplifying method embodiment corresponding to a method performed by the eNB in the embodiment marked A in FIG. 3. The method comprises obtaining 401 a buffer status from a UE which is served by the eNB. This may be a UE which the eNB is considering to steer to the WLAN in order to free resources e.g. for other UEs which do not have Wi-Fi coverage, or for UEs having more delay sensitive data, such as VoIP. In case it is only DL traffic that the eNB considers to steer to the WLAN, no information may need to be obtained 401 from the UE, since the DL buffer associated with the UE will be located in the eNB, or, the eNB may at least have access to the DL buffer information without involving the UE.

The method further comprises requesting 402, e.g. by sending a request for an estimate of a possible throughput in the WLAN. The request consists of or comprises information about the UL and/or DL buffer status of the UE. The request is thus related to an estimate of a possible throughput for the UE in the WLAN, given the buffer status information. The information related to a buffer status would be or comprise an indication of an amount of data present in the UL and/or DL buffer or a binary indication of whether the UL and/or DL buffer comprises data or not.

The information related to a buffer status could further be related to, e.g. comprise information related to one of, or be subdivided into, certain traffic types, such as delay sensitive traffic; best effort traffic; traffic of a specified priority and/or traffic associated with a specified quality requirement. Further, the information related to a buffer status could be related to a set or sub-set of wireless devices served by the eNB (although here it is assumed that it is one UE); a set or sub-set of bearers associated with at least one UE; and/or a set or sub-set of logical channels associated with at least one UE. In other words, the information may in the simplest case comprise only an indication of whether the UE related buffers comprises data or not, but may alternatively indicate more refined information, such as the amount of data associated with a certain logical channel associated with traffic of a certain priority.

The information related to a buffer status could further comprise an identifier of the UE and/or an indication of a signal quality related to signals received from the WLAN at the UE. Information, such as a UE identifier could be used by the WLAN to determine e.g. UE capabilities in order to make an adequate throughput estimate. If no UE identifier is provided, an indication of a signal quality may be used by the WLAN to determine at least to which extent the UE may receive signals from the WLAN during the current conditions. The eNB may only intend to steer either a UE's DL or UL traffic. In that case, the eNB may report either only the DL buffer size or only the UL buffer size for a UE. By buffer size is here meant an amount of data waiting in a buffer to be transmitted (and not e.g. a maximum amount of data that a certain buffer may hold).

The method illustrated in FIG. 4 further comprises obtaining 403, from the WT, an estimate of a possible throughput for the UE in the WLAN, wherein the estimate is a prediction based on the information related to a buffer status provided 402 to the WT. The estimate, i.e. prediction, is obtained in response to the provided information about UE buffer status. Based on the obtained estimate, the eNB may determine 404 whether to initiate steering 405 of at least part of the traffic associated with the UE to the WLAN.

Figure 5:
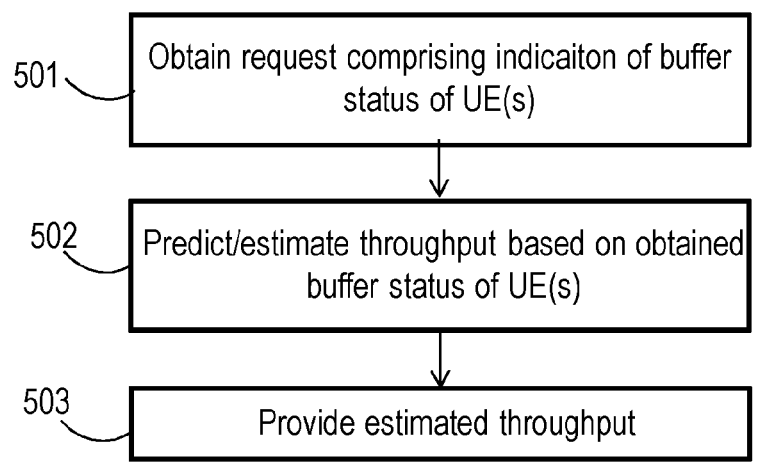
FIG. 5 is a flow chart showing a method performed by a WLAN node, according to an exemplifying embodiment.

FIG. 5 illustrates an exemplifying method embodiment corresponding to a method performed by the WT in the embodiment marked A in FIG. 3. The method comprises obtaining 501 information comprising an indication of a buffer status of a UE from an eNB in an LTE network. The information could compose or be comprised in a request for a throughput estimate, and may have the characteristics as described in association with FIG. 4 above. The method further comprises predicting or estimating 502 a possible throughput in the WLAN based on the obtained 501 information related to a buffer status. In other words, the WT determines which throughput that could be offered the UE if it was to connect to the WLAN with the buffer status indicated in the obtained 501 information. This could also be described as that the WT determines an estimate of the throughput. The method further comprises providing 503, to the eNB, the estimated possible throughput for the UE. Thereby, the eNB is enabled to use the estimated throughput for a decision of whether to steer traffic related to the UE to the WLAN or not.

The information related to buffer status provided from the eNB to the WT may be configured in different ways. For example, the information could be provided in a new type of message, which could be denoted e.g. $M_B$.

The message $M_B$ could indicate the DL and/or UL buffer status of one or multiple UEs. For example, the buffer status could be represented by a buffer size, which indicates the amount of traffic in a transmission buffer, e.g. with a certain granularity. Alternatively, the indication of the buffer status could be in a binary form, i.e. indicating only if there is any data to transmit or not. The message $M_B$ may be transmitted either in a dedicated frame/message or as additional information elements in an existing frame/message, e.g. load information exchange frames between the networks.

Figure 6:
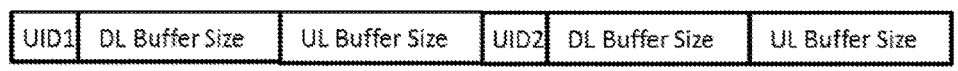
FIG. 6 illustrates a new type of message for conveying buffer status information according to an exemplifying embodiment.
Figure 7:
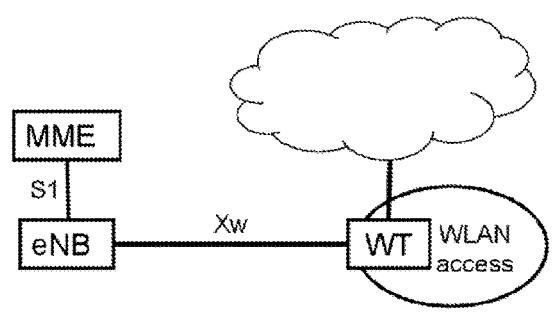
FIG. 7 illustrates an interface between an LTE network and a WLAN, as suggested by 3GPP.

An exemplifying format of a dedicated frame for the $M_B$ transmission is shown in FIG. 6. The frame comprises or consists of three information categories denoted e.g.: "UID" as a UE identity, "DL buffer size" and "UL buffer size". The UID should be a UE identity which is recognizable by a WLAN system. One example of a usable UID is a WLAN MAC address. Another example of a usable UID is an identifier agreed upon between the WLAN and 3GPP network. The DL/UL buffer size may be an index which is mapped to a range of buffer sizes e.g. in bytes. In a special case, the buffer size may be represented by one bit to indicate if there is any data in the buffer or not.

In embodiments where $M_B$ is to be included in other signaling frames, $M_B$ may be included e.g. in a request message as additional information elements. As mentioned above, a 3GPP node, e.g. the eNB in embodiment A in FIG.

3, may request a predicted WLAN user throughput from a WLAN node (WT) by sending a request message to the WLAN node.

The information related to buffer status, such as a message $M_B$, may be transmitted from a 3GPP node to a WLAN node via an interface between the two networks. For example, the interface may be a to-be-standardized Xw interface between an eNB and a WLAN termination (WT) node as specified in 3GPP TR 37.870 Section 5.1.2 and shown in FIG. 7. Examples of nodes which can implement the WT are WLAN access point (AP) and access controller (AC) but it should be appreciated that the WT can be implemented also in other nodes, and may be a stand-alone node.

A UE may be engaged in different services associated with different types of traffic. For example, a certain UE may have one bearer for voice traffic and one bearer for best effort Internet traffic. These bearers will have very different quality of service (QoS) requirements, and would therefore, typically, be handled differently. For example, the voice traffic would be scheduled with higher priority than the best effort Internet traffic, as the voice traffic is more sensitive to latency than internet traffic. Another differentiation with regards to handling could be that the voice traffic would not be offloaded to WLAN, as WLAN may not fulfill the strict requirements associated with voice traffic, while the best effort Internet traffic could be offloaded to WLAN.

In LTE, logical channels (bearers) are mapped to logical channel groups, where logical channels with similar requirements can be mapped to the same logical channel group. The UE could then, for uplink (UL), report the buffer status for the logical channel groups.

In some exemplifying embodiments, the eNB may provide information related to buffer status e.g. in terms of the buffer size per traffic type. This, "per traffic type" may then be e.g. per logical channel, bearer or logical channel group, etc. This may also be described as that the eNB provides a buffer status report or a buffer size report.

The information related to buffer status may be accompanied by additional information about the traffic such as QoS requirement for the different traffic, type of traffic, latency requirements, traffic patterns, etc.

In some exemplifying embodiments, the eNB will report, to the WT, the buffer size for a subset of the UE's bearers/ logical channels. Alternatively or in addition, the eNB may report a ratio of the UE's actual buffer size, or a ratio of the UE's buffer size per bearer, to the WT.

This allows the eNB to indicate or report, to the WT, the buffer status only for traffic or bearers which the eNB considers steering to WLAN. For example, if the eNB only considers steering some of a UE's low priority traffic to WLAN, while keeping the UE's high priority traffic in LTE, the WT does not need to be informed about the buffer size for traffic which the LTE network anyway does not consider to steer to WLAN. Hence, the accuracy of the throughput prediction will be improved.

Figure 8:
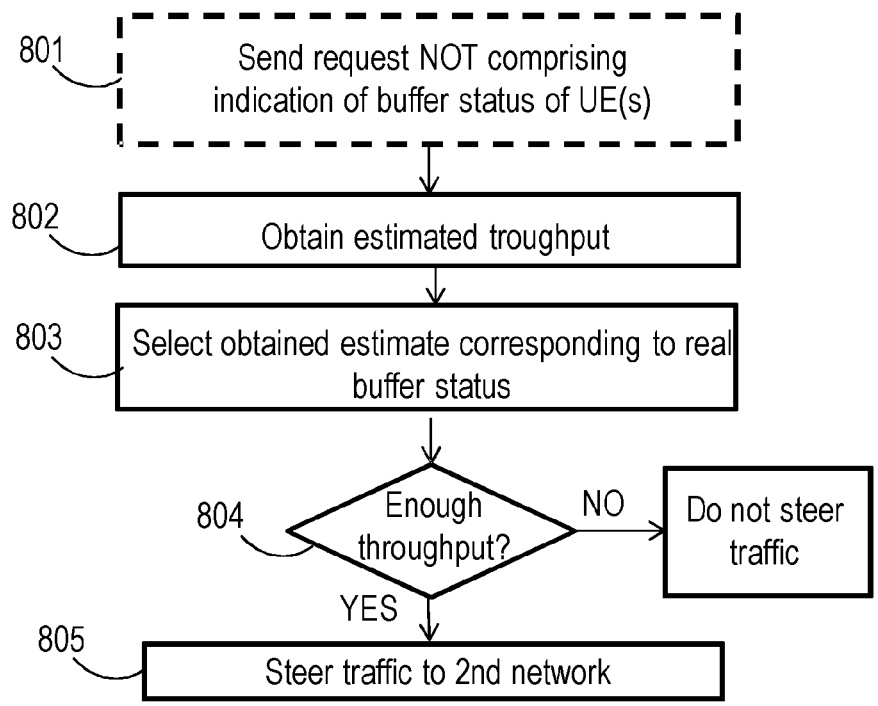
FIG. 8 is a flow chart showing a method performed by a 3GPP node, according to an exemplifying embodiment.

FIG. 8 illustrates an exemplifying method embodiment corresponding to the methods performed by the eNBs in the embodiments marked B and C in FIG. 3. The method comprises (for the eNB in embodiment B but not the eNB in embodiment C in FIG. 3, thus dashed outline), requesting information about user throughput from a WT, e.g. by means of sending a request message. The request does not comprise information about a buffer status of a UE served by the eNB. Possibly the request comprises an indication of a preferred set of default buffer statuses e.g. from amongst a predefined group of sets, and/or a number of UEs for which a throughput estimate is required.

The method further comprises, for both embodiment B and C in FIG. 3, obtaining 802 a number of alternative estimated possible throughputs associated with, i.e. given, different buffer statuses of the at least one wireless device. Since the WLAN has not been provided with any information about actual buffer status of any UE, the throughputs are calculated based on configured buffer statuses, e.g. a set of default buffer statuses. The configured buffer statuses may be known to both networks, and/or may be signaled from the WT to the eNB. The predicted throughputs may be obtained in form of a list, table or record, or in a specially configured message, indicating which throughput that is predicted/ estimated for each one of a number of alternative buffer statuses. Here, the obtaining 802 of the estimated throughput corresponds to the obtaining information related to a buffer status of at least one UE from a network node in another communication network.

The method illustrated in FIG. 8 further comprises determining, or deciding 804, whether to initiate steering of at least part of traffic associated with the at least one UE to the WLAN based on the obtained estimate. In other words, the eNB may select, e.g. from an obtained table, the predicted throughput associated with the default buffer status which is closest to the actual buffer status of the UE or UEs which the eNB considers to steer to the WLAN. That is, the predicted throughput which is associated with the default buffer status which corresponds best to the actual buffer status related to the traffic which the eNB considers to steer to the WLAN. When the selected predicted throughput is determined to be sufficient for the traffic in question, the eNB initiates steering of said traffic to the WLAN. "Initiating steering of traffic" could also be expressed as "steering traffic", and may comprise e.g. sending a traffic steering command to a UE. If the estimated throughput is determined to be insufficient for the traffic in question, said traffic is not steered to the WLAN.

Figure 9:
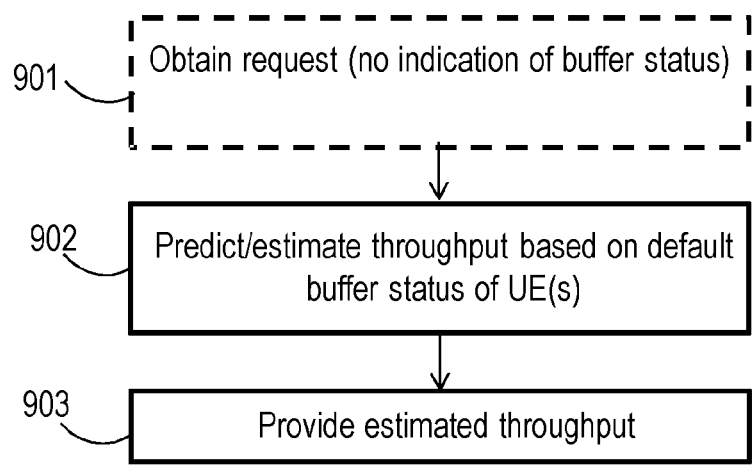
FIG. 9 is a flow chart showing a method performed by a WLAN node, according to an exemplifying embodiment.

FIG. 9 illustrates an exemplifying method embodiment corresponding to a method performed by the WT in the embodiments marked B and C in FIG. 3. The method may comprise (e.g. in embodiment B, but not C) obtaining 901 a request for information about user throughput. The request is obtained from the eNB, and may have the same characteristics as described above in association with FIG. 8. The method further comprises estimating, i.e. predicting 902, a possible throughput in the WLAN for different configured or default buffer statuses of at least one "hypothetic" UE. In other words, the WT determines which throughput that could be offered a UE if it was to connect to the WLAN having one of the configured buffer statuses. This could also be expressed as that the WT determines an estimate of the throughput. The method further comprises providing 903, to the eNB, a number of alternative estimated possible throughputs given different buffer statuses, e.g. in form of a list or table where each entry in the list/table has a mapping between a certain buffer size (content) to a certain predicted throughput. This has the benefit that the eNB does not need to disclose the buffer size of the UE, which may be desired in a deployment where the WT is operating as a slave with regards to the eNB.

In some of the embodiments described above, a WLAN WT can send a table or list to the eNB indicating the predicted user throughput for different buffer statuses. After receiving such a table, the eNB can select one entry from the table based on the UE buffer status. In such embodiments, the UE buffer status is hidden from the WLAN network.

An example of such a table comprising predicted throughputs for different alternative buffer statues is shown in table 1 below. In the exemplifying table 1, predicted DL and UL throughput is provided for three different combinations of DL and UL buffer status The procedure of sending and receiving the predicted user throughput table is depicted e.g. in embodiments B and C in FIG. 3, and in actions 802 and 903 in FIGS. 8 and 9. The eNB may send a request for a predicted user throughput in WLAN for one or multiple UEs. The request may be sent as a message with a flag set to indicate to the WT that the predicted user throughput table for different buffer statuses is requested. In another embodiment, the request message may contain an indication of or an explicit list of buffer statuses for which the user throughput should be predicted. After the user throughput is predicted, the WT sends the predicted user throughput table to the eNB. The eNB selects one entry from the table for one UE based on the buffers status of the UE.

TABLE 1

An example of the predicted user throughput for alternative buffer statuses

| DL data in buffer | UL data in buffer | Predicted user DL throughput | Predicted user UL throughput |
| --- | --- | --- | --- |
| Yes | No | Thrp_DL_1 | Thrp_UL_1 |
| No | Yes | Thrp_DL_2 | Thrp_UL_2 |
| Yes | Yes | Thrp_DL_3 | Thrp_UL_3 |

A simple example of an expression for throughput prediction could be e.g.:

UE throughput=(Avg transmitted packet size)/(Avg transmission time for each packet), where the assumption is that the predicted future throughput will resemble the historical throughput. However, since WLAN (Wi-Fi) implements a 'listen-before-talk' transmission, the larger number of UEs which are uploading data, the longer it takes to transmit a DL packet.

A WLAN throughput prediction needs to consider both the amount of data to transmit and how much airtime the transmission will take. When the WLAN throughput prediction is performed for a UE to be connected to WLAN, it is important to know whether that UE has either or both UL and DL traffic. If the UE has only DL traffic, the DL transmission to the UE will be made by the WLAN AP and the UE will not be competing for the UL channel access when being connected to the AP. The AP will schedule the DL transmission for the UE once it gets channel access. If a UE has UL traffic, i.e. has data in the UL buffer, the UE will compete for the channel access with other UEs already connected to the AP, which may be referred to as existing UEs. Thus, each existing UE will get less opportunity for channel access when a new UE is added. When a UE has both UL and DL traffic, the DL and UL transmission will compete for the channel access between each other as well as with existing UEs.

Figure 10A:
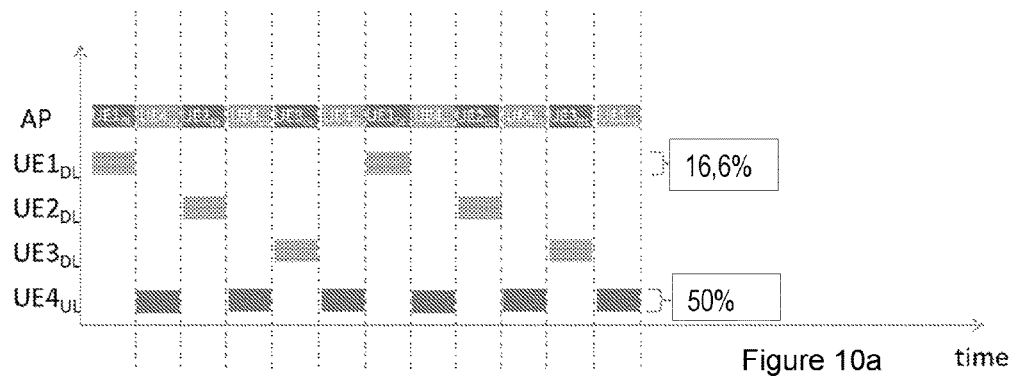
FIGS. 10a-10c are diagrams showing how air-time may be divided between different nodes in a WLAN.

FIG. 10a shows a simplified time distribution when there are 3 downloading UEs ($UE1_{DL}$-$UE3_{DL}$) and 1 uploading UE ($UE4_{UL}$) connected to an AP. As can be noted, the 3 downloading UEs share the APs airtime, which here is 50% of the total airtime, equally (16.6% for each UE) whereas the single uploading UE uses 50% of the airtime.

Figure 10B:
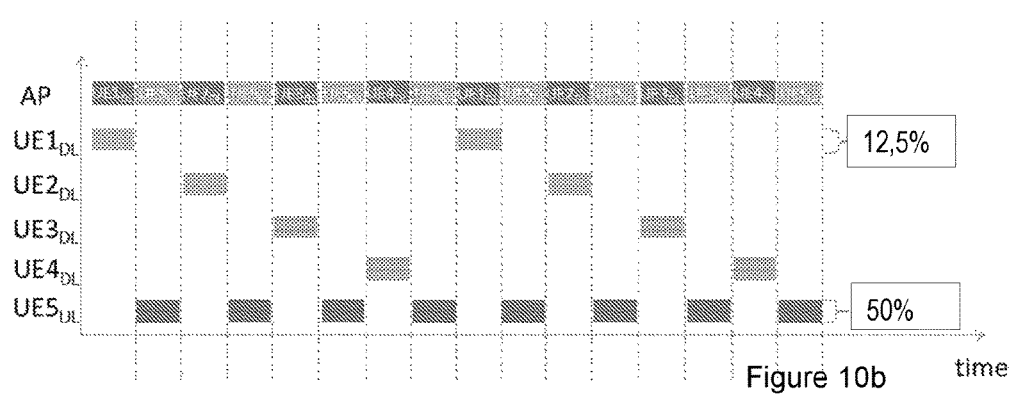

In FIG. 10b, there is one added downloading UE, as compared to the situation illustrated in FIG. 10a. The added UE has to share the APs airtime (50%) with the existing UEs, resulting in 12.5% for each UE, but the addition of the UE does not influence the airtime share of the uploading UE.

Figure 10C:
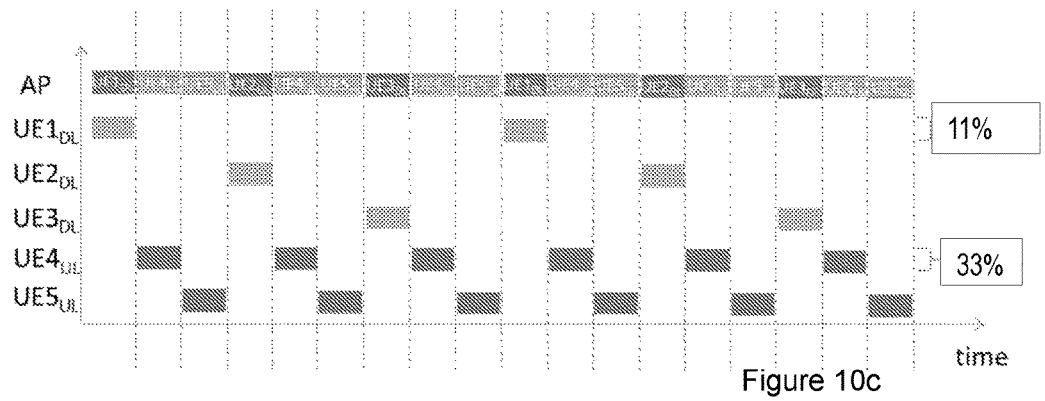

In FIG. 10c, there is instead an added uploading UE, which will now share the whole airtime so that each uploading UE obtains 33% of the total airtime and the three downloading UEs share the remaining 33%, i.e. 11% each.

Thus, in order to predict how much throughput a UE, which is not yet using WLAN, will get if connecting, the prediction need to consider whether the UE will use upload, download or both. Otherwise, an arbitrary assumption will lead to either overestimated or underestimated UE throughput.

According to some embodiments described herein, the WT is enabled to access such knowledge of a UE which can be potentially handed over from a 3GPP to a WLAN network, and thus increase the accuracy of the throughput prediction for the UE. The accurate throughput prediction result will benefit the traffic steering decision between the 3GPP and WLAN networks.

As illustrated e.g. in embodiment D in FIG. 3, there are other possible usages for the WLAN to be aware of the UE's buffer status. One such use is admission control. For example, when the WLAN gets a connection request from a UE (or an "STA" according to WLAN terminology) it needs to decide whether to admit or reject the UE's connection attempt. When determining whether to admit or reject the UE it is useful to know the UE's buffer status as this will indicate how much data the UE has in its UL/DL buffers and hence it can be used to determine how much resources the UE would consume if the UE gets connected.

The WLAN may be provided with a buffer status report from the eNB prior to that the eNB sends a traffic steering command to the UE, i.e. a command which will trigger the terminal to perform a connection attempt to the WLAN. It would also be possible that, upon a connection attempt from a UE, the WLAN will request the buffer status from the eNB for that UE. The WLAN AP may have connections to multiple eNBs, and in that case maybe only one eNB responds to the request, i.e. the one which the terminal is connected to. It may also be so that the UE is not connect to any eNB, and hence no eNB will respond to the request. By "not respond" it should be appreciated that this could mean that the eNBs responds with a message indicating that they do not have the buffer status for the UE.

The request message may contain the UE's WLAN MAC address, which may be used by the eNB to identify the UE.

For example, if the WLAN AP is heavily loaded it may not admit access for a UE which it knows has a lot of data in its buffers as the WLAN's resources, e.g. air interface resources, backhaul resources, processing resources, etc, may not suffice to serve the terminal while still providing service also to other UEs, if any. However, if the UE's buffer is small, then it (the AP) may admit the UE, assuming that it (the AP) can serve the small amount of data traffic that the UE has.

The methods and techniques described above may be implemented in wireless communication networks, e.g. in one or more network nodes, such as e.g. radio access nodes and/or core network nodes. The methods could be implemented in a distributed manner, e.g. a plurality of nodes or entities could each perform a part of the actions e.g. at different locations in the network. For example, one or more embodiments could be implemented in a so-called cloud solution, or a "Centralized RAN" or "Split Architecture", where e.g. an eNB is divided into 2 or more separate nodes. Correspondingly, the network could be configured such that actions of the method embodiments are performed e.g. partly in a radio access node and partly in a core network node. The distributed case could be referred to or described as that the method is performed by an arrangement or a network node operable in the communication network, but that the arrangement or the network node could be distributed in the network, and not necessarily be comprised in a physical unit e.g. close to an antenna.

Figure 11A:
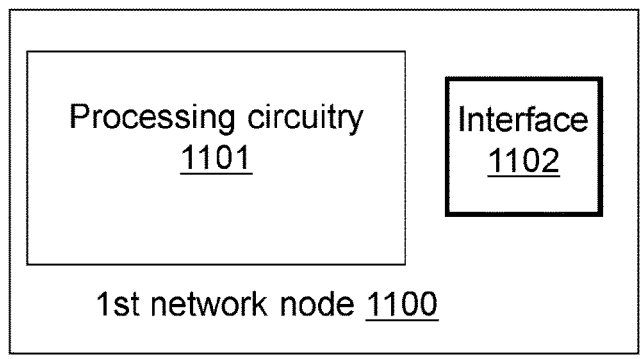
FIGS. 11a-11c illustrate different implementations of a first network node according to exemplifying embodiments.

An exemplifying embodiment of a first network node, or an arrangement, operable in a wireless communication network is illustrated in a general manner in FIG. 11a. The first network node or arrangement 1100 is configured to perform at least one of the method embodiments described above with reference to FIGS. 3-5 and 8-9. The network node or arrangement 1100 is associated with the same technical features, objects and advantages as the previously described method embodiments. The first network node or arrangement 1100 will be described in brief in order to avoid unnecessary repetition. In order to facilitate understanding it could be said, in analogy with the above examples, that the first network node may be an eNB or an AP, depending on which embodiment that is implemented.

The first network node or arrangement may be implemented and/or described as follows:

The network node or arrangement 1100 comprises processing circuitry 1101, and one or more communication interfaces 1102. The processing circuitry may be composed of one or more parts which may be comprised in one or more nodes in the communication network, but is here illustrated as one entity. The processing circuitry 1101 is configured to cause the network node or arrangement 1100 to provide information related to a buffer status of at least one wireless device to a second network node in a second wireless communication network. The processing circuitry 1101 may further be configured to cause the network node or arrangement to obtain, from the second network node, an estimate of a possible throughput for the at least one wireless device, wherein the estimate is based on the information related to a buffer status. Alternatively, the processing circuitry 1101 may be configured to cause the network node or arrangement to estimate a throughput for a set of default buffer statuses. The one or more communication interfaces 1102, which may also be denoted e.g. Input/Output (I/O) interfaces, include a network interface for sending data between nodes or entities in the communication network.

Figure 11B:
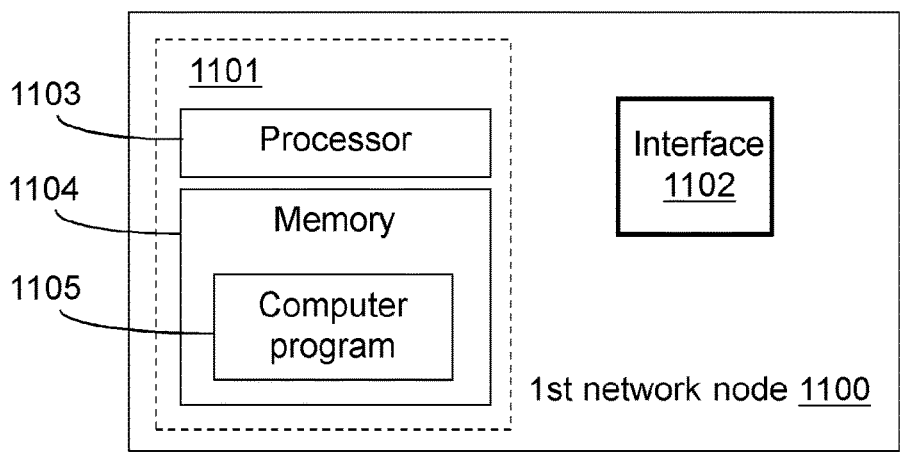

The processing circuitry 1101 could, as illustrated in FIG. 11b, comprise one or more processing means, such as a processor 1103, and a memory 1104 for storing or holding instructions. The memory would then comprise instructions, e.g. in form of a computer program 1105, which when executed by the one or more processing means 1103 causes the network node or arrangement 1100 to perform the actions described above. The processing circuitry 1101 may, as previously mentioned be composed of one or more parts and be comprised in, or distributed over, one or more nodes in the communication network, but is here illustrated as one entity.

Figure 11C:
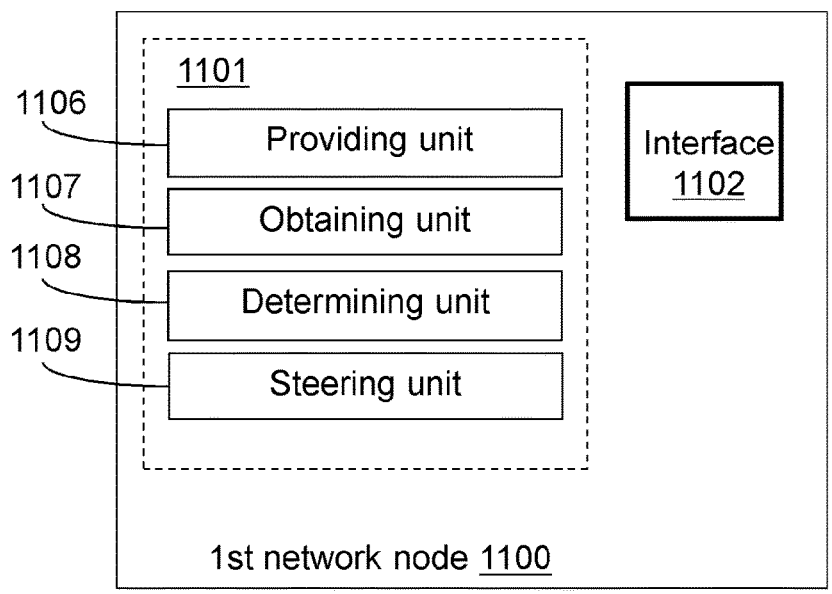

An alternative implementation of the processing circuitry 1101 is shown in FIG. 11c. The processing circuitry here comprises e.g. a providing unit 1106, configured to cause the network node or arrangement to provide information related to a buffer status of at least one wireless device to a second network node in a second wireless communication network. The processing circuitry could further comprise an obtaining unit 1107, configured to cause the network node or arrangement to obtain, from the second network node, an estimate of a possible throughput for the at least one wireless device, wherein the estimate is based on the information related to a buffer status. The processing circuitry could further comprise a determining unit 1108 for determining whether to initiate steering of at least part of traffic associated with the at least one wireless device to the second wireless communication network based on the obtained estimate. The processing circuitry could further comprise a steering unit 1109 for initiating a steering of at least part of traffic associated with the at least one wireless device to the second wireless communication network based on the obtained estimate. The processing circuitry could comprise alternative or other units or modules configured to perform other method embodiments described herein.

The processing circuitry could comprise more units, and may, as previously mentioned be comprised in, or distributed over, one or more nodes or entities in the communication network, but is here illustrated as comprised in one entity.

Figure 12A:
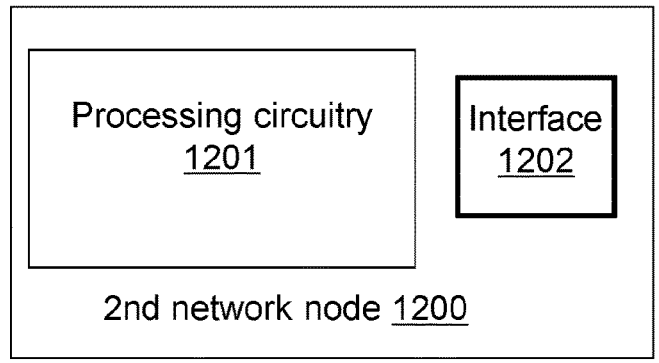
FIGS. 12a-12c illustrate different implementations of a second network node according to exemplifying embodiments.

An exemplifying embodiment of a second network node, or an arrangement, operable in a second wireless communication network is illustrated in a general manner in FIG. 12a. The second network node or arrangement 1200 is configured to perform at least one of the method embodiments described above with reference to FIG. 3-5 or 8-9. The second network node or arrangement 1200 is associated with the same technical features, objects and advantages as the previously described method embodiments. The network node or arrangement 1200 will be described in brief in order to avoid unnecessary repetition. As above, in analogy with the above examples, the second network node may be an AP or an eNB, depending on which embodiment that is implemented.

The second network node or arrangement may be implemented and/or described as follows:

The network node or arrangement 1200 comprises processing circuitry 1201, and one or more communication interfaces 1202. The processing circuitry may be composed of one or more parts which may be comprised in one or more nodes in the communication network, but is here illustrated as one entity.

The processing circuitry 1201 is configured to cause the network node or arrangement 1200 to obtain information related to a buffer status of at least one wireless device from a first network node in a first wireless communication network.

The processing circuitry 1201 may further be configured to cause the network node or arrangement to estimate a throughput for a set of default or indicated buffer statuses. The processing circuitry 1201 may further be configured to cause the network node or arrangement to provide, to the first network node, an estimate of a possible throughput for the at least one wireless device, wherein the estimate is based on the obtained information related to a buffer status. The one or more communication interfaces 1202, which may also be denoted e.g. Input/Output (I/O) interfaces, include a network interface for sending data between nodes or entities in the communication network.

Figure 12B:
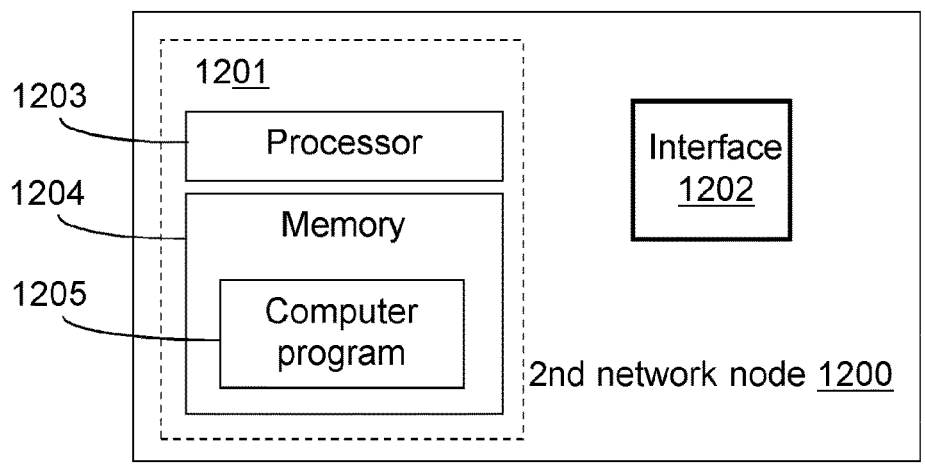

The processing circuitry 1201 could, as illustrated in FIG. 12b, comprise one or more processing means, such as a processor 1203, and a memory 1204 for storing or holding instructions. The memory would then comprise instructions, e.g. in form of a computer program 1205, which when executed by the one or more processing means 1203 causes the network node or arrangement 1200 to perform the actions described above. The processing circuitry 1201 may, as previously mentioned be composed of one or more parts and be comprised in, or distributed over, one or more nodes in the communication network, but is here illustrated as one entity.

Figure 12C:
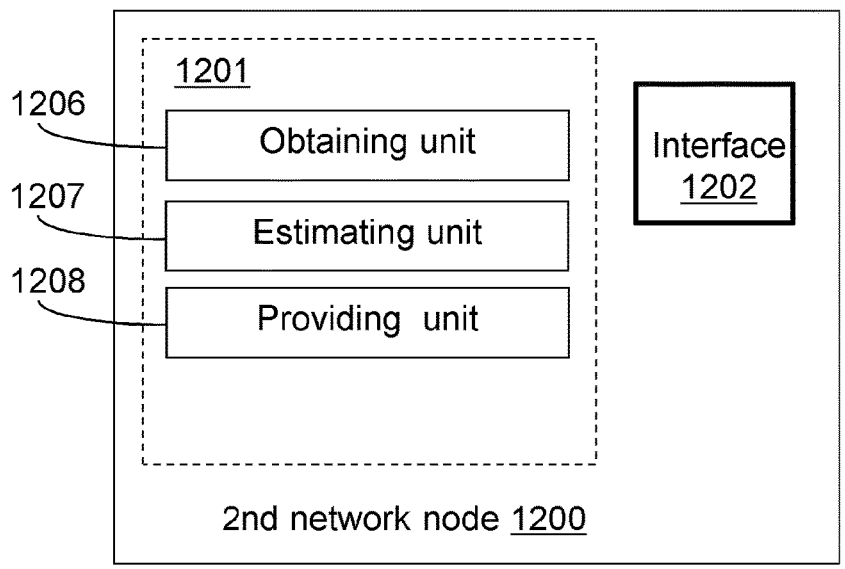

An alternative implementation of the processing circuitry 1201 is shown in FIG. 12c. The processing circuitry here comprises an obtaining unit 1206, configured to cause the network node or arrangement to obtain information related to a buffer status of at least one wireless device from a first network node in a first wireless communication network. The processing circuitry could further comprise an estimating unit 1207, configured to cause the network node or arrangement to estimate a throughput for a set of default or indicated buffer statuses; and may further comprise a providing unit 1208 for provide, to the first network node, an estimate of a possible throughput for the at least one wireless device, wherein the estimate is based on the obtained information related to a buffer status. The processing circuitry could comprise alternative or other units or modules configured to perform other method embodiments described herein.

The processing circuitry could comprise more units, and may, as previously mentioned be comprised in, or distributed over, one or more nodes or entities in the communication network, but is here illustrated as comprised in one entity.

The network nodes and arrangements described above could be configured for the different method embodiments described herein, e.g. in regard of how a buffer status is indicated and utilized.

The steps, functions, procedures, modules, units and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules, units and/or blocks described above may be implemented in software such as a computer program for execution by suitable processing circuitry including one or more processing units. The software could be carried by a carrier, such as an electronic signal, an optical signal, a radio signal, or a computer readable storage medium before and/or during the use of the computer program e.g. in one or more nodes of the wireless communication network. The processing circuitry described above may be implemented in a so-called cloud solution, referring to that the implementation may be distributed, and may be referred to e.g. as being located in a so-called virtual node or a virtual machine.

The flow diagram or diagrams presented herein may be regarded as a computer flow diagram or diagrams, when performed by one or more processors. A corresponding arrangement or apparatus may be defined as a group of function modules, where each step performed by a processor corresponds to a function module. In this case, the function modules are implemented as one or more computer programs running on one or more processors.

Examples of processing circuitry includes, but is not limited to, one or more microprocessors, one or more Digital Signal Processors, DSPs, one or more Central Processing Units, CPUs, and/or any suitable programmable logic circuitry such as one or more Field Programmable Gate Arrays, FPGAs, or one or more Programmable Logic Controllers, PLCs. That is, the units or modules in the arrangements in the communication network described above could be implemented by a combination of analog and digital circuits in one or more locations, and/or one or more processors configured with software and/or firmware, e.g. stored in a memory. One or more of these processors, as well as the other digital hardware, may be included in a single application-specific integrated circuitry, ASIC, or several processors and various digital hardware may be distributed among several separate components, whether individually packaged or assembled into a system-on-a-chip, SoC.

It should also be understood that it may be possible to re-use the general processing capabilities of any conventional device or unit in which the proposed technology is implemented. It may also be possible to re-use existing software, e.g. by reprogramming of the existing software or by adding new software components.

The embodiments described above are merely given as examples, and it should be understood that the proposed technology is not limited thereto. It will be understood by those skilled in the art that various modifications, combinations and changes may be made to the embodiments without departing from the present scope. In particular, different part solutions in the different embodiments can be combined in other configurations, where technically possible.

When using the word "comprise" or "comprising" it shall be interpreted as non-limiting, i.e. meaning "consist at least of".

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

The invention claimed is:

1. A method performed by a first network node in a first wireless communication network, the method comprising:
    obtaining buffer status for each of at least one wireless device;
    sending, to a second network node in a second wireless communication network, a request for throughput information concerning the second wireless communication network, wherein the request includes information related to the buffer status of the at least one wireless device;
    obtaining one or more estimated throughputs for the at least one wireless device in the second wireless communication network; and
    based on the obtained estimated throughputs, determining whether or not to steer traffic associated with the at least one wireless device to the second wireless communication network.

2. The method according to claim 1, wherein the information related to a buffer status is an indication of a buffer status of the at least one wireless device.

3. The method according to claim 1, wherein the information related to buffer status comprises at least one of:
an indication of an amount of data present in a buffer;
a binary indication of whether a buffer comprises data or not.

4. The method according to claim 1, wherein obtaining buffer status for each of at least one wireless device comprises receiving an actual buffer status from one or more of the wireless devices.

5. The method according to claim 1, wherein obtaining buffer status for each of at least one wireless device comprises selecting a default buffer status for one or more of the wireless devices.

6. The method according to claim 1, wherein the information related to a buffer status is related to one or more of:
downlink traffic;
uplink traffic;
a type of traffic.

7. The method according to claim 1, wherein obtaining the one or more estimated throughputs for the at least one wireless device in the second wireless communication network comprises one of the following:
receiving the one or more estimated throughputs from the second network node, wherein the received one or more estimated throughputs are based on the information related to the buffer status provided in the request; and
determining the one or more estimated throughputs based on default buffer status for the at least one wireless device.

8. The method according to claim 1, wherein the information related to a buffer status comprises a number of alternative estimated possible throughputs given different buffer statuses of the at least one wireless device.

9. A method performed by a second network node in a second wireless communication network, the method comprising:
receiving, from a first network node in a first wireless communication network, a request for throughput information concerning the second wireless communication network, wherein the request includes information related to a buffer status of at least one wireless device;
estimating one or more throughputs for the at least one wireless device in the second wireless communication network, wherein the estimated one or more throughputs are based on the information related to the buffer status included in the request; and
sending the estimated one or more throughputs to the first network node.

10. The method according to claim 9, wherein the information related to a buffer status is an indication of a buffer status of the at least one wireless device.

11. The method according to claim 9, wherein the information related to buffer status comprises at least one of:
an indication of an amount of data present in a buffer;
a binary indication of whether a buffer comprises data or not.

12. The method according to claim 9, wherein:
the information related to the buffer status includes a number of wireless devices that are candidates for steering to the second wireless communication network; and
the estimated one or more throughputs are based on one or more default buffer status associated with the number of candidate wireless devices.

13. The method according to claim 9, wherein:
the information related to the buffer status includes, for each of the at least one wireless device, an indication of an amount of data present in a buffer of the wireless device; and
the estimated one or more throughputs are based on the indicated amounts of data present in the buffers of the at least one wireless device.

14. A first network node operable in a first wireless communication network, the first network node comprising:
at least one processor; and
at least one memory storing computer-executable instructions that, when executed by the at least one processor, configure the first network node to:
obtain buffer status for each of at least one wireless device;
send, to a second network node in a second wireless communication network, a request for throughput information concerning the second wireless communication network, wherein the request includes information related to the buffer status of the at least one wireless device;
obtain one or more estimated throughputs for the at least one wireless device in the second wireless communication network; and
based on the obtained estimated throughputs, determine whether or not to steer traffic associated with the at least one wireless device to the second wireless communication network.

15. A second network node operable in a second wireless communication network, the second network node comprising:
at least one processor; and
at least one memory storing computer-executable instructions that, when executed by the at least one processor, configure the second network node to:
receive, from a first network node in a first wireless communication network, a request for throughput information concerning the second wireless communication network, wherein the request includes information related to a buffer status of at least one wireless device;
estimate one or more throughputs for the at least one wireless device in the second wireless communication network, wherein the estimated one or more throughputs are based on the information related to the buffer status included in the request; and
send the estimated one or more throughputs to the first network node.

16. A non-transitory, computer-readable medium storing computer-executable instructions that, when executed by at least one processor comprising a first network node in a first wireless communication network, configure the first network node to perform operations corresponding to the method of claim 1.

17. A non-transitory, computer-readable medium storing computer-executable instructions that, when executed by at least one processor comprising a second network node in a second wireless communication network, configure the second network node to perform operations corresponding to the method of claim 9.

18. The method of claim 1, wherein the first wireless communication network is a 3GPP network and the second wireless communication network is a WLAN.

19. The method of claim 9, wherein the first wireless communication network is a 3GPP network and the second wireless communication network is a WLAN.

20. The first network node of claim 14, wherein the first wireless communication network is a 3GPP network and the second wireless communication network is a WLAN.

* * * * *